(12) United States Patent
Kshatriya

(10) Patent No.: US 8,560,156 B2
(45) Date of Patent: Oct. 15, 2013

(54) POWER ASSISTING SYSTEM

(75) Inventor: Tejas Krishna Kshatriya, Pune (IN)

(73) Assignee: KPIT Cummins Infosystems Limited, Pune (IN)

( * ) Notice: Subject to any disclaimer, the term of this patent is extended or adjusted under 35 U.S.C. 154(b) by 0 days.

(21) Appl. No.: 13/496,161

(22) PCT Filed: Nov. 18, 2009

(86) PCT No.: PCT/IN2009/000656
§ 371 (c)(1),
(2), (4) Date: Apr. 17, 2012

(87) PCT Pub. No.: WO2011/033521
PCT Pub. Date: Mar. 24, 2011

(65) Prior Publication Data
US 2012/0197473 A1  Aug. 2, 2012

(30) Foreign Application Priority Data
Sep. 15, 2009 (IN) .......................... 2108/MUM/2009

(51) Int. Cl.
*B60L 11/00* (2006.01)
*B60W 10/04* (2006.01)

(52) U.S. Cl.
USPC ........................................ 701/22; 180/65.285

(58) Field of Classification Search
USPC .......... 701/22, 83, 84, 93; 180/65.21, 65.285, 180/65.29, 165
See application file for complete search history.

(56) References Cited

U.S. PATENT DOCUMENTS

| 1,402,250 | A | 1/1922 | Pieper |
| 6,044,923 | A | 4/2000 | Reagan et al. |
| 6,294,843 | B1 | 9/2001 | Kato et al. |
| 6,295,487 | B1* | 9/2001 | Ono et al. ........................ 701/22 |
| 7,056,251 | B2* | 6/2006 | Ibaraki ............................... 475/5 |
| 2003/0144773 | A1* | 7/2003 | Sumitomo ....................... 701/22 |
| 2007/0240922 | A1* | 10/2007 | Kikuchi ........................ 180/65.4 |
| 2008/0093143 | A1* | 4/2008 | Harrison ........................ 180/165 |

(Continued)

FOREIGN PATENT DOCUMENTS

| EP | 913287 B1 | 9/2004 |
| JP | 8142886 A | 6/1996 |
| JP | 2001 047880 A | 2/2001 |

OTHER PUBLICATIONS

International Search Report and Written Opinion of International Application No. PCT/IN2009/000656, date of mailing May 18, 2010, 5 pages.

(Continued)

*Primary Examiner* — Mary Cheung
(74) *Attorney, Agent, or Firm* — Foley & Lardner LLP

(57) ABSTRACT

The present invention relates to a modular power assisting system. In particular the present invention relates to a modular electric power assisting system that is adaptable to a vehicle/engine driven system so as to be operated/powered by electric system and/or its original power system. The synergistic combination of the motor system; motor control system and energy storage device coupled to the regenerative braking system of the present invention enables the power assisting system of the present invention to adapt to the vehicle/engine without involving substantial modifications in engine, power train, drive train and vehicle. The engine and electric motor exploits advantages of each of the power source based on the operating conditions of the vehicle/engine driven system by selectively responding to the engine's power demands so as to enhance fuel efficiency, reduce undesirable emissions and provide better drivability.

40 Claims, 9 Drawing Sheets

(56) References Cited

U.S. PATENT DOCUMENTS

Figure 1:
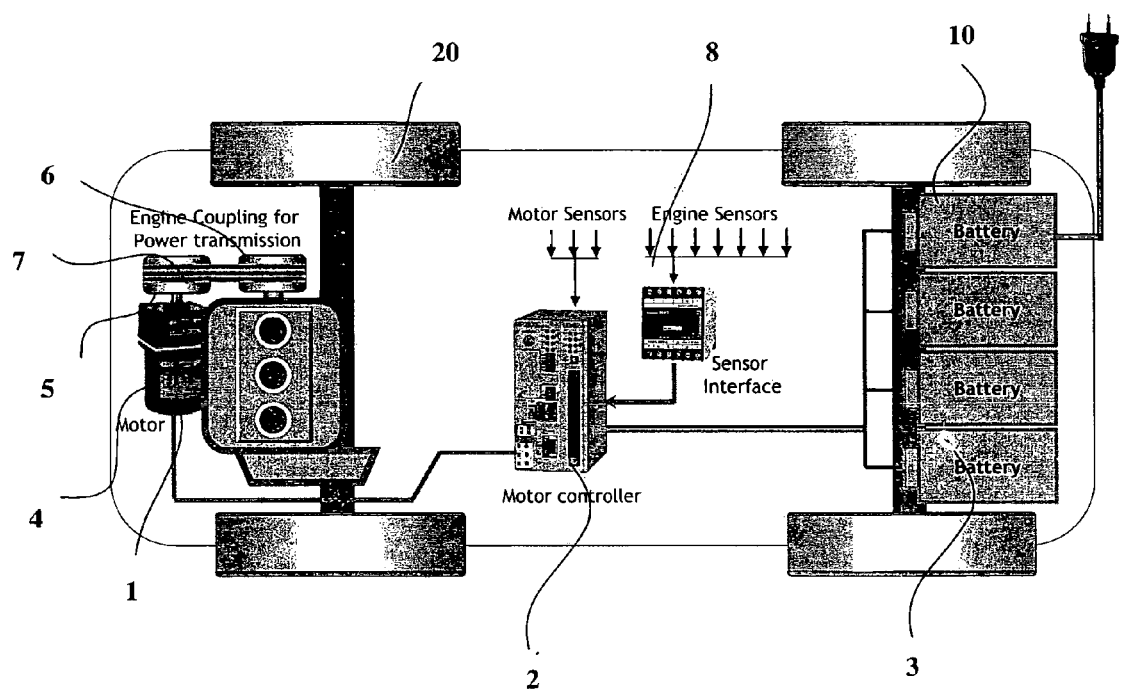

| | | | |
|---|---|---|---|
| 2008/0276610 A1* | 11/2008 | McDowell | 60/517 |
| 2008/0319594 A1* | 12/2008 | Shibata et al. | 701/22 |
| 2010/0296204 A1* | 11/2010 | Ichikawa et al. | 361/15 |

OTHER PUBLICATIONS

Final Office Action dated Jun. 27, 2013 in U.S. Appl. No. 12/882,003.

* cited by examiner

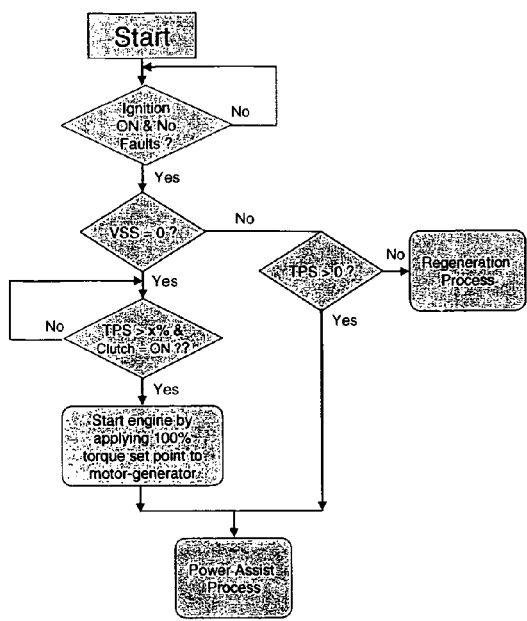
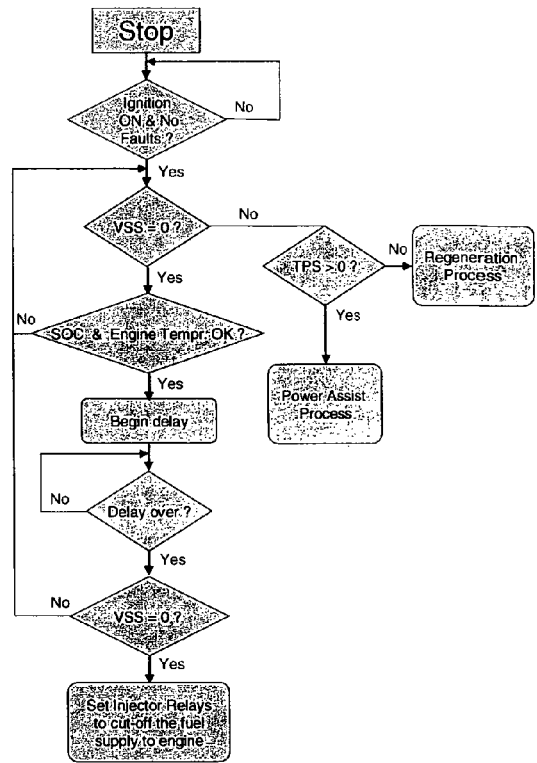
Note : x is the accelerator pedal position.
Figure 3a
Figure 3b Main flow

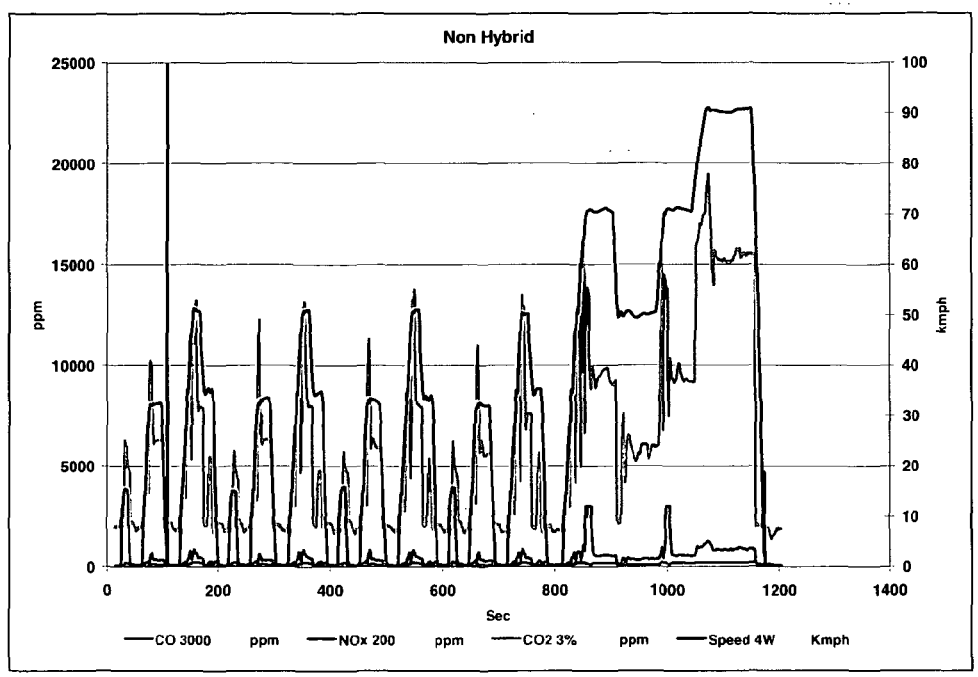
Figure 10a Emission levels without using power assisting system
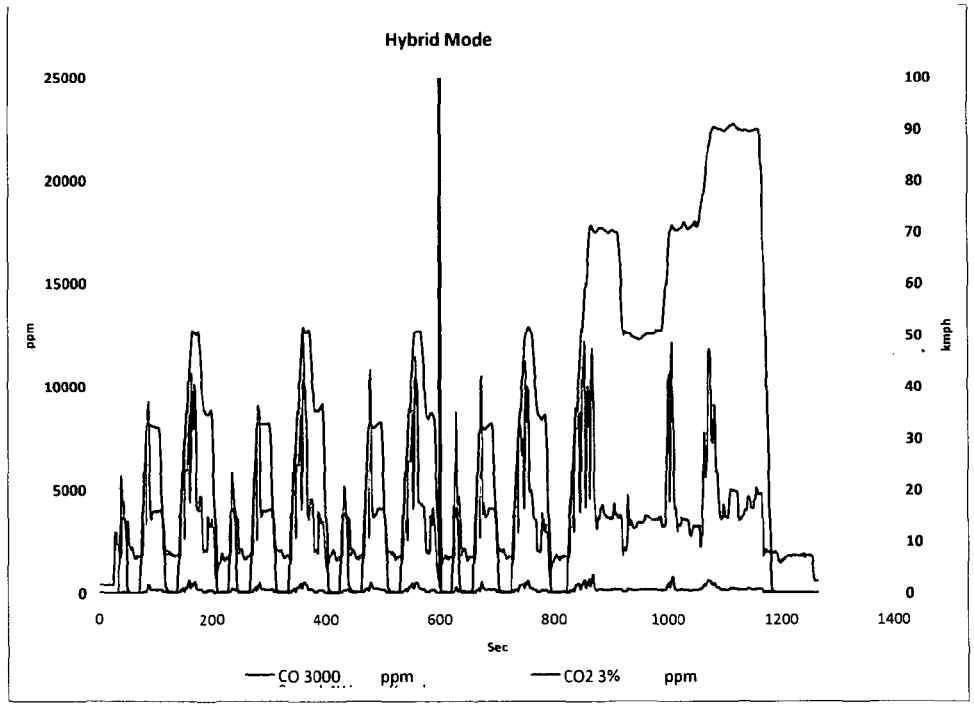
Figure 10b Emission levels using power assisting system

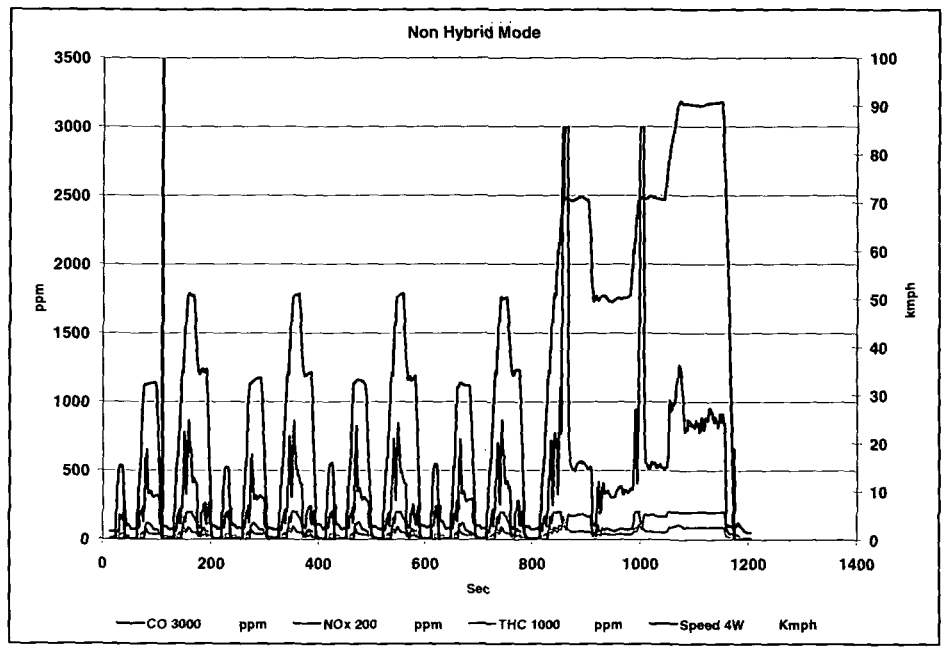
Figure 11a Emission levels without using power assisting system
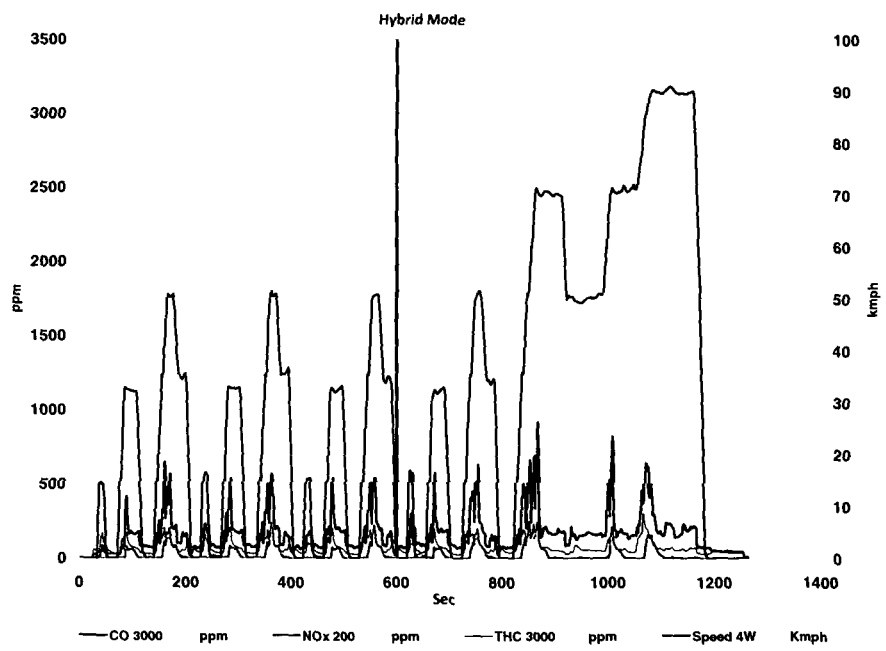
Figure 11b Emission levels with power assisting system

POWER ASSISTING SYSTEM

CROSS-REFERENCE TO RELATED APPLICATIONS

The present application is a National Stage Application of International Patent Application No. PCT/IN2009/000656, filed Nov. 18, 2009, which claims priority to and the benefit of Indian Patent Application No. 2108/MUM/2009, filed Sep. 15, 2009. The entire disclosures of International Patent Application No. PCT/IN2009/000656 and Indian Patent Application No. 2108/MUM/2009 are incorporated by reference herein.

FIELD OF INVENTION

The present invention relates to a modular power assisting system. In particular the present invention relates to an adaptable modular electric power assisting system that integrates with vehicle/engine driven system so as to operate the same on electric and the original vehicle power source mode.

BACKGROUND OF INVENTION

Most cars require a relatively big engine to produce enough power to accelerate the car quickly. The gas engine on a conventional car is sized for the peak power requirement. In fact, most drivers use the peak power of their engines less than one percent of the time. The hybrid cars that use electric and engine power source are designed to overcome problem of engine sizing and enhance engine performance. These cars use a much smaller engine, one that is sized closer to the average power requirement than to the peak power. In a small engine, however, the efficiency can be improved by using smaller, lighter parts, by reducing the number of cylinders and by operating the engine closer to its maximum load.

However, this necessitates development of dedicated engine coupled with the electric motor and drive, transmission system. Further tailored transmission system is needed to run these vehicles. This has resulted in impediment of application of hybrid technology to existing or newly developing vehicle/engine driven systems. Further, it is always desirable to size and operate engine of any of the engine driven system in the range of average power requirement to enhance fuel efficiency. Thus, there is a need to provide power assisting system for engine drive systems/vehicles so as to provide flexibility of integrating such assisting system with the engines/vehicles to enhance engine/vehicle performance without the need of using dedicated drive system, engines etc.

Hybrid cars were conceptualized over a hundred years ago. First discussions of the hybrid cars date back to 1902. Piper from Belgium was the first one to file for a patent in the US on the subject of hybrid. His patent was granted 100 years ago. Although there were several attempts in the past, there is no reference found in the literature for a highly efficient, easy to retrofit, and cost effective hybrid design. With the current major fluctuations in the prices of crude oil, there is an upsurge in the interest of designing and building hybrid cars. However, their demand remains low due to high cost associated with it. Attempts are made to develop hybrid vehicle system. The prior art is mentioned hereunder. U.S. Pat. No. 6,367,570 discloses a hybrid electric vehicle with electric motor providing strategic power assist to load balance internal combustion engine. It comprises of internal combustion engine coupled to motor and control system.

U.S. Pat. No. 5,678,646 discloses a propulsion system for a vehicle comprising an electric motor, circuit breakers which switch field windings of the electric motor, as well as a cooling device which cools the field windings and the circuit breakers by its coolant circuit. The electric motor is realized in the form of a first modular unit which is mechanically functional in itself. The circuit breakers are assembled in at least one second modular unit, which is connected firmly to the first modular unit to form a propulsion unit. The individual modular units can be separated from one another and are connected to one another both by detachable electrical interface connections and also by detachable coolant interface connections. This construction makes it possible to selectively expand the propulsion unit by adding additional modular units, or in the event of the failure or malfunction of individual modular units to replace the modular units without having to replace the entire propulsion unit.

PCT Publication WO/1992/018346 discloses a hybrid electric vehicle propulsion system having an external combustion free-piston engine is provided with an integral linear electric current generator and a pulse frequency controller. The system includes a power integration processor, a frequency modulator circuit and a pulse width modulator circuit, the power integration processor controls the frequency modulator circuit and the pulse width modulator circuit to produce both a frequency modulated pulsed current and an auxiliary power current which varies in pulse width. Both the frequency modulated pulsed current and the pulse width modulated auxiliary current are combined to power an electric drive motor having an integral electronic differential. A small auxiliary power source, such as a rechargeable battery pack, provides the auxiliary current for acceleration and hill climbing power. The external combustion engine may burn any pollution free fuel (such as natural gas, alcohol, propane, etc.) and runs at a constant peak efficiency speed to generate constant frequency electric current from coils integrated into the engine. The generator current is sufficient to propel the vehicle in ordinary driving situations with smooth speed control of the drive motor. The propulsion motor combines one fixed stator, and two axially opposed permanent magnet or induction-type rotors, one for each output propulsion shaft.

U.S. Pat. No. 5,172,784 discloses a hybrid electric vehicle propulsion system having an external combustion free-piston engine is provided with an integral linear electric current generator and a pulse frequency controller. The system includes a power integration processor, a frequency modulator circuit and a pulse width modulator circuit, the power integration processor controls the frequency modulator circuit and the pulse width modulator circuit to produce both a frequency modulated pulsed current and an auxiliary power current which varies in pulse width. Both the frequency modulated pulsed current and the pulse width modulated auxiliary current are combined to power an electric drive motor having an integral electronic differential.

United States Patent Application 20060000651 discloses a thermoelectric augmented hybrid electric propulsion system for a hybrid electric vehicle is disclosed. The system includes a combustion engine and an electric motor for rotating wheels of the vehicle. A thermoelectric device having a hot side provided in thermal contact with the combustion engine is electrically connected to the electric motor. In operation, the thermoelectric device receives waste heat from the combustion engine and generates electrical power for the electric motor to augment the vehicle propulsion.

U.S. Pat. No. 6,823,840 discloses manifold absolute pressure control system and method for a hybrid electric vehicle. It discloses methods and apparatus are provided for controlling manifold absolute pressure in a hybrid electric vehicle that includes an internal combustion engine in parallel with an electric motor/generator. The method includes the steps of monitoring the torque demand on the hybrid electric vehicle, monitoring the manifold absolute pressure magnitude and change rate of the internal combustion engine, supplying torque from the internal combustion engine to meet the torque demand; and supplying torque from the motor/generator to load-level the torque supplied from the internal combustion engine and to maintain the manifold absolute pressure of the internal combustion engine within an acceptable range and rate.

United States Patent Application 20040174124 discloses motor control method and system for parallel hybrid electric vehicle. A motor control system is provided which control a motor using an acceleration command and an estimated inertia moment of a motor. The motor control method comprises of calculating an estimated inertia moment of a motor, calculating a forward compensation current based on the estimated inertia moment and an acceleration command, calculating a final current command based on a speed controller output current and the forward compensation current, the speed controller output current being calculated based on the acceleration command, and controlling the motor using the final current command.

United States Patent Application 20030098187 discloses a control system and method for a parallel hybrid electric vehicle. It provides a control strategy for a parallel hybrid electric vehicle (HEV) configuration where power from the engine and the motor can each independently provide torque to the vehicle power train.

U.S. Pat. No. 6,321,143 discloses control system and method for a hybrid electric vehicle. The vehicle system controller has a state machine having a plurality of predefined states that represent operating modes for the vehicle. A set of rules is defined for controlling the transition between any two states in the state machine. The states are prioritized according to driver demands, energy management concerns and system fault occurrences. The vehicle system controller controls the transitions from a lower priority state to a higher priority state based on the set of rules.

Japanese Patent JP3580257 discloses a hybrid car wherein at least one part of a transmission line for transmitting power of a plurality of driving power sources to a wheel is made common, and also a power transmission state control device for changing the power transmission state is provided between the two rotational members in the line where the power outputted from the specified driving power source in the plurality of driving power sources is transmitted to the wheel.

Japanese Patent JP2002135910 discloses hybrid vehicle and method for controlling the same. The power outputting unit is provided with a prime mover having an outputting shaft, a driving shaft outputting a power, a power adjusting unit which is coupled with the output shaft and the driving shaft and capable of transmitting to the driving shaft a power outputted from the prime mover, and increased or decreased, a motor having a rotating shaft, a change-over structure which switches a connection status of the rotating shaft, the outputting shaft and the driving shaft, and a change-over control unit controlling the change-over structure.

Japanese Patent JP3817982 discloses hybrid vehicle to improve power transmission efficiency of a continuously variable transmission in a hybrid vehicle.

Torque of an engine is transmitted to wheels through a continuously variable transmission and that torque of a motor generator can be inputted into a torque transmission path between the engine and the wheels, gears adding torque of the motor generator through a planetary gear mechanism.

U.S. Pat. No. 6,155,364 discloses hybrid drive system wherein planetary gear mechanism is disposed radially inwardly of stator coil of motor/generator. It includes (a) an engine operated by combustion of a fuel, (b) a planetary gear mechanism having a sun gear and a carrier one of which is connected to the engine, and a ring gear connected to an output member, (c) a motor/generator connected to the output member, and (d) a differential gear device including output shafts and an input member rotated by a drive force received from the output member, and wherein the motor/generator, the planetary gear mechanism and the output member are arranged coaxially with each other along a first axis, and the output shafts of the differential gear device are disposed along a second axis parallel to the first axis.

The critical review of the above mentioned patents reveal following technology gaps:

Non-availability of electrical drive systems that are adaptable on vehicles without subjecting major changes to the Engine/vehicle/their production line;

Non-adaptable motors for existing engines, in particular situations in which a motor with the same frame size is to be used for range of engine capacities thereby compelling manufacturers to develop dedicated engines integrated with specific motors and power transmission systems;

Non-adaptable control systems that seamlessly interface with engine/vehicle sensors and other control units;

Non-availability of rapid battery charging means.

Need of cooling systems for battery, motor etc.

There is a long-felt need to provide a modular power assisting system, in particular electric power assisting system that is adaptable to a vehicle/engine driven system such that the vehicle/engine driven system can be operated/powered by electric system and its original power system.

OBJECT OF THE INVENTION

The main object of the invention is to provide a modular power assisting system. Further object of the invention is to provide an adaptable modular electric system that is adaptable to a vehicle/engine driven system such that the vehicle/engine driven system can be operated/powered by electric system and/or its original power system.

Another object of the invention is to provide an electric modular power assisting system for vehicle/s to enable the vehicle/s to operate using internal combustion engine and/or electric motor.

Yet another object of the invention is to provide solution with a motor cum generator which is compact for its functionality and has substantially reduced weight.

Another object of the invention is to operate vehicle/engine driven system at reduced capacity and power than existing capacity by adapting modular power assisting system.

Yet another object of the invention is to draw additional power than the rated one of the vehicle/engine driven system by adapting modular power assisting system.

Another object of the invention is to provide a motor with substantially higher current density.

Yet another object of the invention is to operate motor as generator.

Yet another object of the invention is to provide motor control means to control motor speed with respect to operating conditions.

Yet another object of the invention is to provide a means to interface MAP (manifold absolute Pressure) sensor, TPS (Throttle Positioning Sensor) and Vehicle Speed Sensor (VSS) with the motor control system without impacting engine management system of the vehicle on which the power assisting system is to be adapted.

Another object of the invention is to provide means to interface digital signal/s from engine/vehicle to the motor control system.

Another object of the invention is to provide means for interfacing pulsating signal/s from vehicle speed sensors to the motor control system.

Yet another object of the invention is to provide a means to control winding temperature of the motor cum generator of the power assisting system.

Yet another object of the invention is to control current of motor based on MAP, TPS and optionally VSS sensor inputs.

Another object of the invention is to obviate problems associated with fuel consumption measurement for providing control input to the motor.

Another object of the invention is to provide a method to start the motor only and not engine so as to start vehicle from rest.

Yet another object of the invention is to provide a method to start engine upon achieving desired vehicle speed.

Yet another object of the invention is to provide a method to stop engine functioning at the signal or similar operating conditions.

Another object of the invention is to provide a method to configure and adapt motor torque characteristics with the torque characteristics of the engine of the vehicle/engine per se on which the control system is to be adapted.

Another object of the invention is to interface the engine sensors and additional sensor/s if required to the motor controller.

Yet another object of the invention is to isolate ECUs and avoid modifications of the existing vehicle and motor control system.

Yet another object of the invention is to tap signals directly from sensors for the operation of motor control system. Further object of the invention is to tap signal from existing sensors directly rather than tapping them over the CAN.

Another object of the invention is to provide a system to measure manifold absolute pressure, throttle position along with other parameters to estimate power/torque requirements of motor.

Another object of the invention is to provide a motor drive system that couples motor with the engine.

Another object of the invention is to mount and couple electric motor on engine of vehicle obviating problems related to play between engine crankshaft and coupling means, vibrations etc.

Yet another object of the invention is to provide centre distance adjusting means between the motor shaft of the power assisting means and crankshaft of the engine.

Yet another object of the invention is to provide height adjustment means for the motor.

Yet another object of the invention is to utilize reduction in kinetic energy of the vehicle/engine to charge energy storage device by converting the kinetic energy.

Another object of the invention is to provide opportunity based regeneration and regenerative braking system to charge battery of the power assisting system.

Yet another object of the invention is to charge battery of the power assisting system using current pulses.

Yet another object of the invention is to avoid changes/modification in gearbox of the vehicle yet couple the power assisting system.

Yet another object of the invention is to obviate the use of engine starter and alternator of the vehicle/engine.

Yet another object of the invention is to provide a device to seamlessly share load between electric motor and engine of the vehicle so that driver/operator is not required to specifically operate any lever/gear shift or experiences substantial variation Another object of the invention is to minimize gear shift in traffic conditions and enhance drivability.

Yet another object of the invention is to reduce emission levels from the engine of the vehicle/engine driven system.

Another object of the invention is to obviate the use of cooling systems for energy storage means such as battery, motor and motor control system.

Another object of the invention is to adapt motor cum generator to existing engine according to rated rotational speed of the engine and motor so as to compliment the torque characteristics of the engine and motor cum generator.

Thus in accordance with the invention, the system comprises of:
 motor system;
 motor control system configured with the said motor and sensor/s to provide speed/torque control;
 energy storage system comprising energy storage device/s coupled to the regenerative system that utilizes reduction in kinetic energy of the vehicle and/or engine of the engine driven system to charge the said energy storage device/s
wherein
motor system comprises of
one or plurality of motors,
motor mounting means comprising mounting means wherein anti-vibration mounts are adapted to be fitted on the said motor mounting means
wherein the motor transmission means comprises of a first pulley with a profiled groove mounted on the shaft of the said motor, second pulley mounted on the crank shaft of the said engine wherein said pulleys are operably coupled with a belt, chain or the likes such that motor assists in sharing engine load as well as generates power that is used to charge one or plurality of energy storage devices; alternately transmission means is a universal or jaw coupling adapted between said crank shaft and motor shaft
wherein
energy storage system comprises of one or plurality of batteries, battery charging system configured with the said motor control system and motor, regenerative braking system comprising solid state power devices, a dedicated battery control system embedded with a battery control programme logic loop, external charging means, and ultra capacitor
wherein
motor control system comprises of PID controller, power devices, reservoir capacitor, microcontroller/data processing means embedded dedicated tailored logic loop, data storage means, RAM, power source, data input and output means;
sensor system comprising interface means to configure engine/vehicle sensors with the said motor control system wherein engine/vehicle sensors are interfaced via isolators with the said control system
wherein the said motor control system operates in steps of:
 interfacing with the existing sensors (of the vehicle/engine) so as to acquire signals from the sensors'
 measurement of difference between ambient and intake manifold pressure and communicating the same to the data processing means;
 measurement of throttle position and communicating to the data processing means;

optionally measuring airflow to the engine and communicating to the data processing means;

estimating engine demand based on the said measurements;

estimating motor power necessary to assist the engine;

transmitting a signal to the said motor so as to respond to the engine demand.

In another aspect of invention the said system is adapted to be used on aircraft propulsion system. In another aspect of the invention the said system of the present invention is adapted to be used in marine propulsion system. In another aspect of the invention the system of the present invention is adaptable to any stationary engine. In yet another aspect of the invention the said system is adapted on two, three, four and such multi wheeled vehicles.

DESCRIPTION OF THE INVENTION

Features and advantages of the invention will become apparent in the following detailed description and the preferred embodiments with reference to the accompanying drawings.

FIG. 1 Schematic illustrative representation of the system (Sheet 1)

Figure 2:
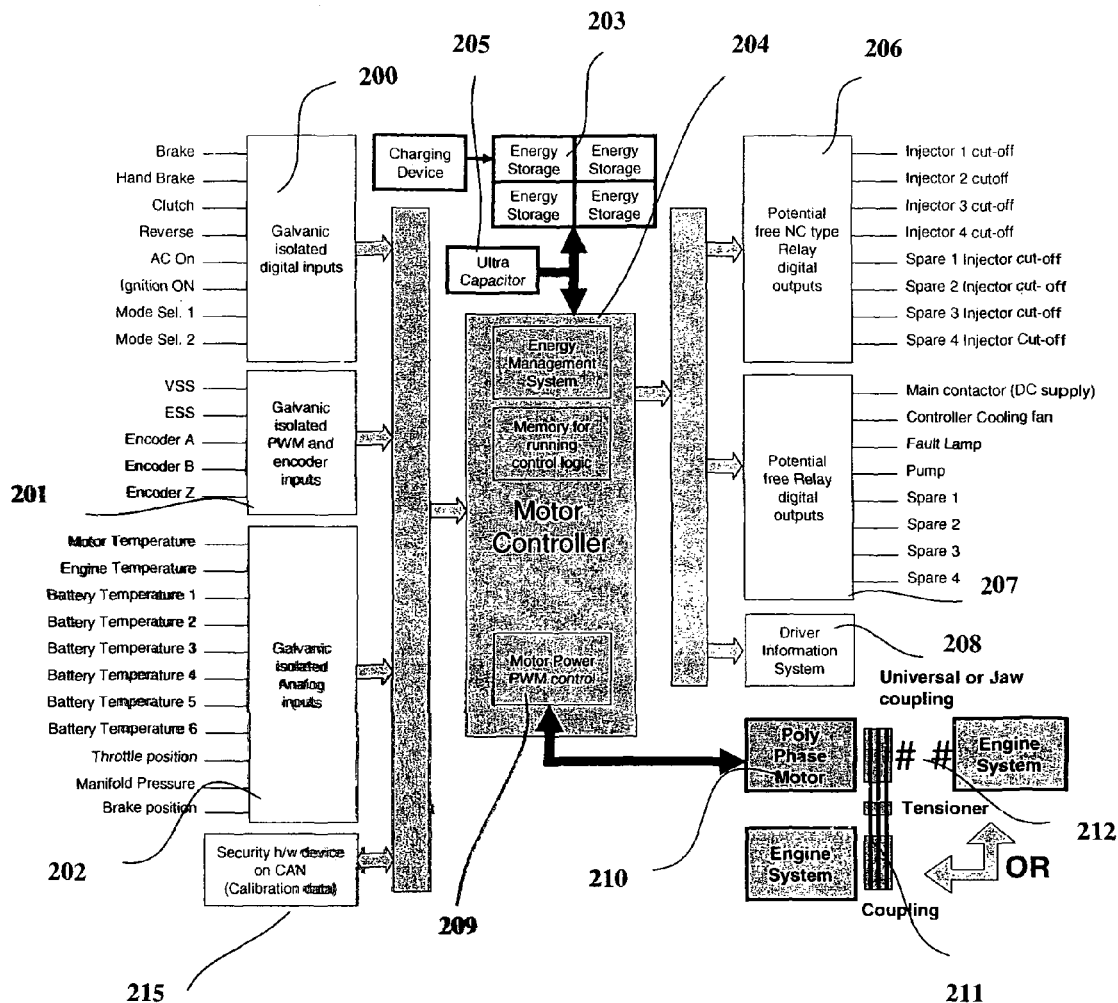

FIG. 2 Schematic of motor control system (Sheet 2)

FIG. 3 Motor control system operation steps (Sheet 3)

Figures 4, 5:
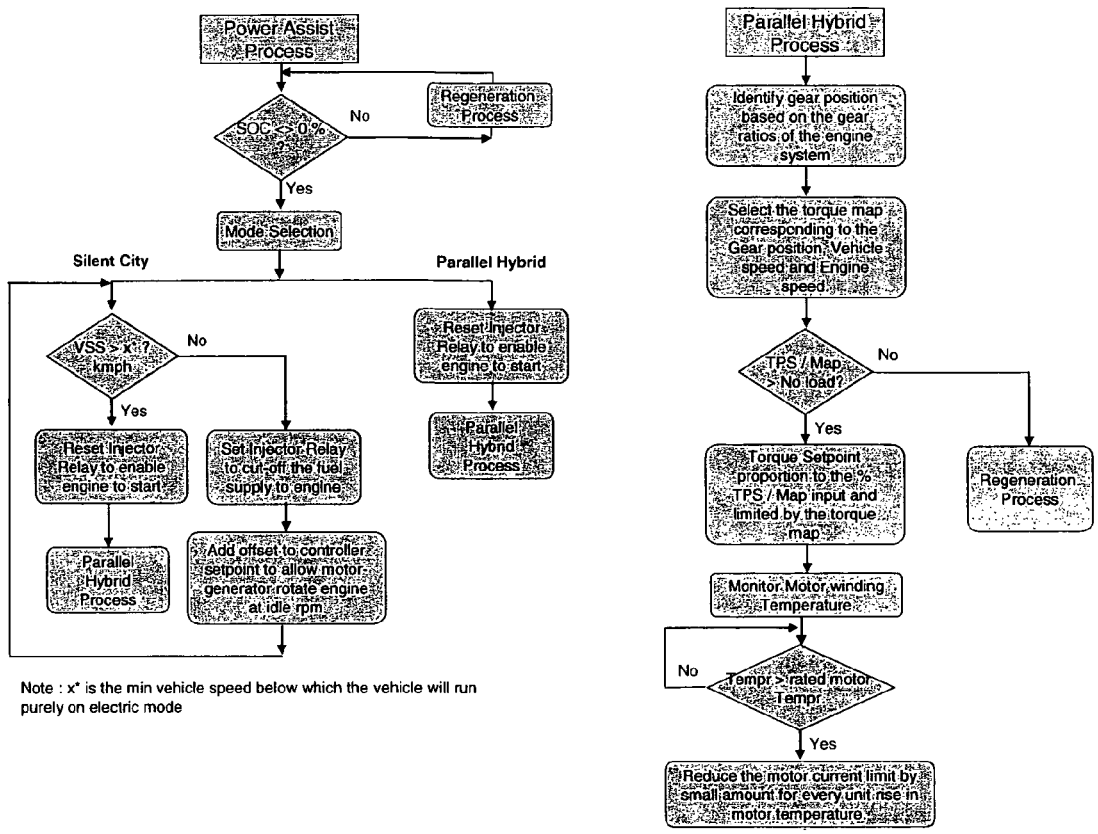

FIG. 4 Motor control system operation steps (Sheet 4)

FIG. 5 Motor control system operation steps (Sheet 4)

Figure 6:
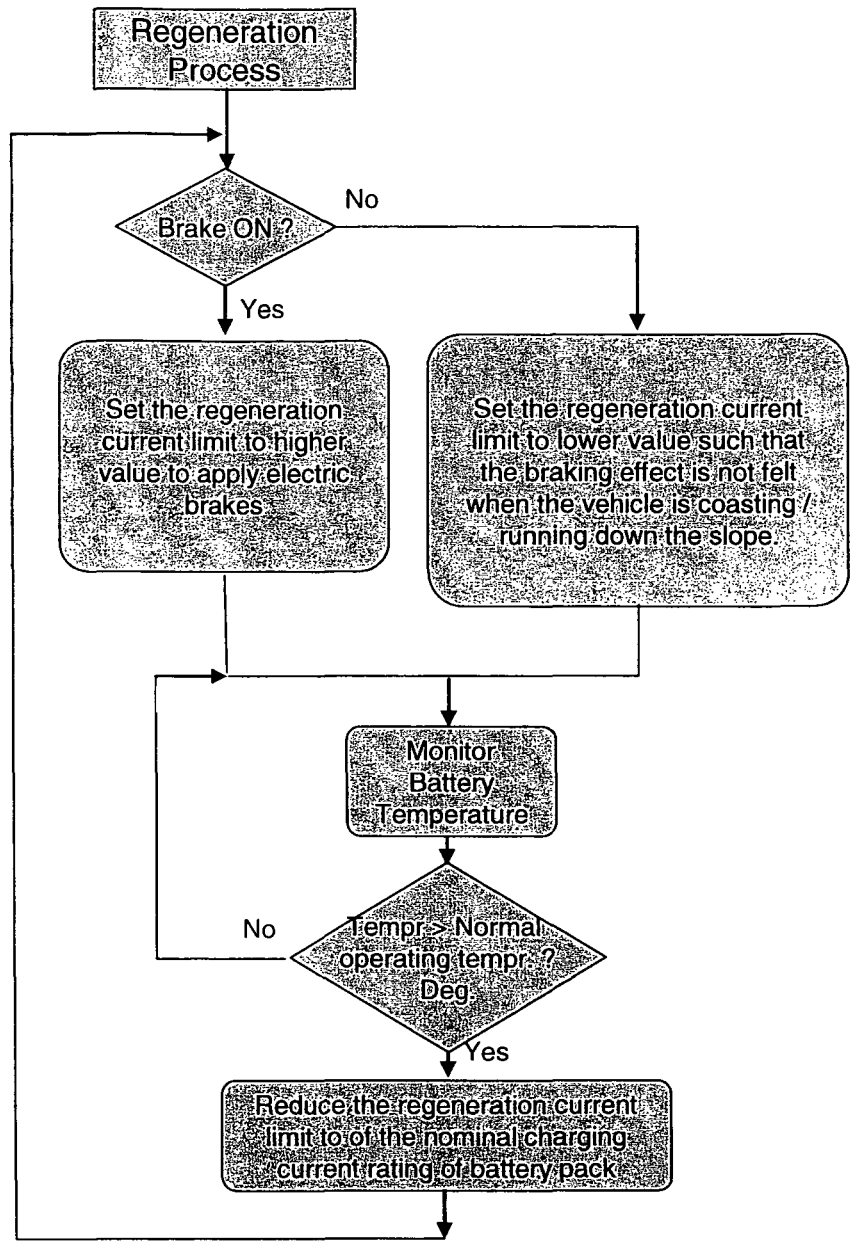

FIG. 6 Regeneration process operation steps (Sheet 5)

Figure 7:
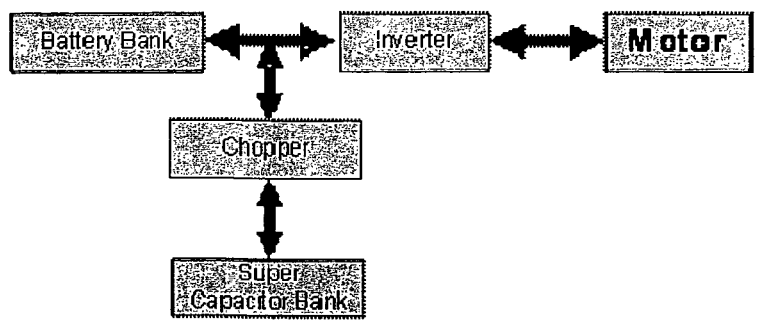

FIG. 7 Schematic representation of battery charging system (Sheet 6)

Figure 8:
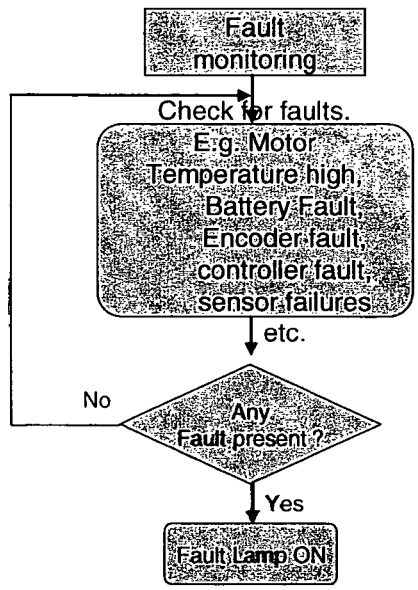
Figure 8:
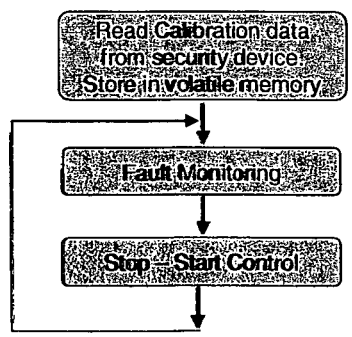

FIG. 8 Fault detecting process (Sheet 6)

Figure 9:
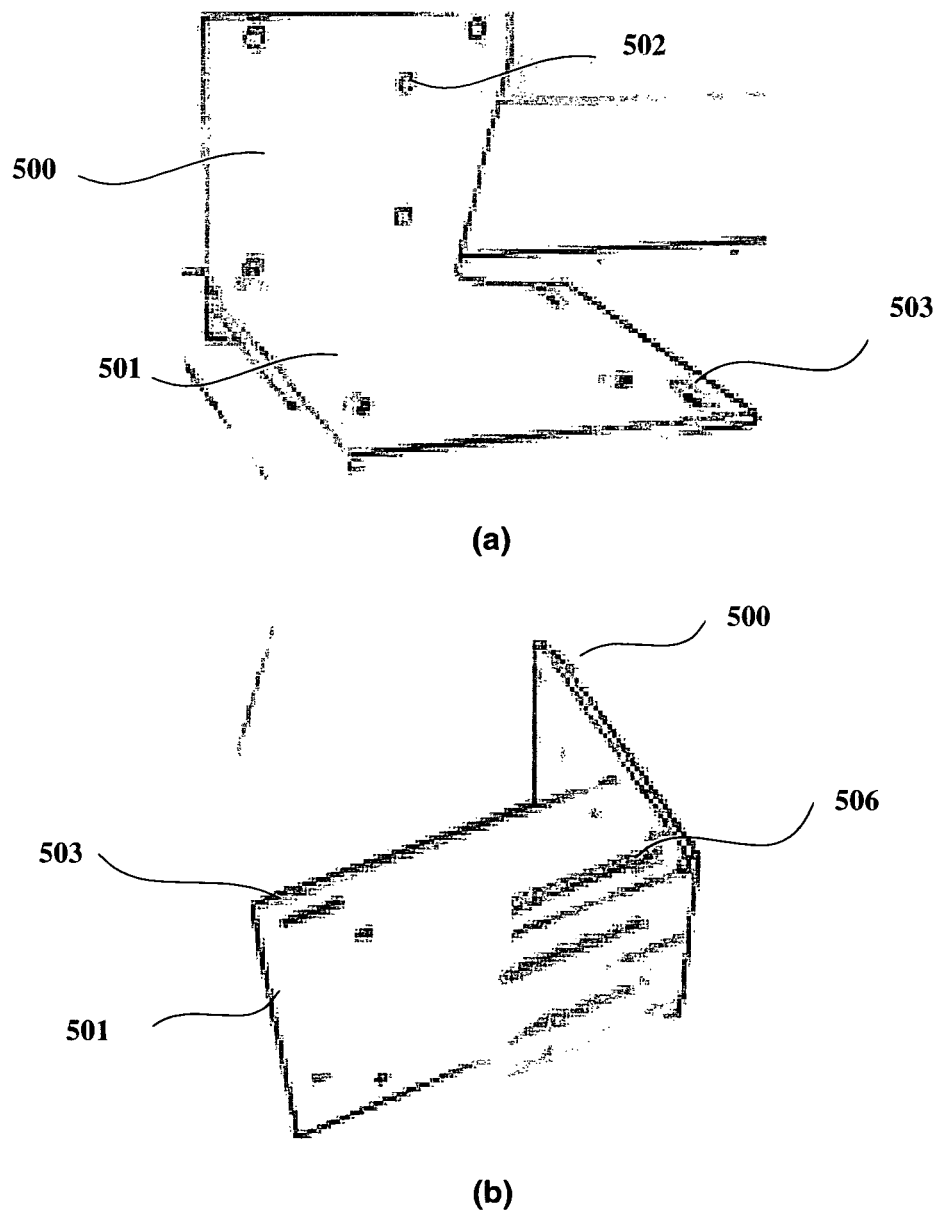

FIG. 9 Illustration of motor mounting means (Sheet 7)

FIG. 10 Emission charts (Sheet 8)

FIG. 11 Emission charts (Sheet 9)

Schematic of the system is depicted in FIG. 1. The system comprises of a motor system 1, motor control system 2 and energy storage energy storage device 3. Though engine and vehicle (on which the system of the present invention is adapted) is not part of the present invention, bottom view of the integrated system with vehicle is illustrated for better understanding of the invention.

The said motor system 1 comprises of a tailored motor cum generator 4 that is adapted to be mounted on the engine (of the vehicle on which the system is to be adapted) with the aid of motor mounting means. One of the embodiments of the mounting means is depicted in FIG. 9. The mounting means is in the form of a bracket. It comprises of first substantially flat support surface 500 provided with one or plurality of openings 502 for mounting motor cum generator. The second substantially flat surface 501 is fixed/connected/welded to the first surface 503 in substantially perpendicular manner. The said second surface is provided with elongated openings 503. The said second surface 501 is connected with the said first surface 500 with ribs 506. The anti-vibration mounting means is mounted on one of the surfaces or both the surfaces in a manner so as to avoid surface contact of the first and/or second surface with the engine/chassis/mounting provision of the vehicle.

In one of the embodiment plurality of motors are coupled to the said engine. The tailored compact motor also functions as generator. The motor mounting means is provided with vibration damping provision and is tailored according to the space available in the vicinity of the engine. The said motor system further comprises of engine coupling and transmission means wherein first pulley 5 of the said transmission means is mounted on the shaft of the said motor 4 and second pulley 6 is mounted on the crank shaft of the said engine wherein said pulleys are operably coupled with a belt 7 such that motor 4 assists in sharing engine load as well as generates power that is used to charge one or plurality of energy storage devices. In one of the embodiment, belt tensioning pulley is used to maintain belt tension. The said belt tensioning pulley is disposed between the said first and second pulley such that it is movable in perpendicular direction to the linear travel direction of the said belt. The said tensioning pulley is adapted to be fitted so as to vary the perpendicular distance adjusting means that is in the form of a threaded arrangement so as to rotate the same and adjust travel of the said tensioning pulley to adjust belt tension between the said first and second pulley. In yet another embodiment, universal coupling is used to couple the said motor cum generator and crank shaft of the engine. In yet another embodiment the said pulley is of ribbed belt type pulley and corresponding belt is ribbed type of belt. In yet another embodiment the ratio of diameter of the said first pulley and second pulley is in the range of 1:1 to 1:2 so as to compliment the torque characteristics of the engine and motor cum generator.

FIG. 2 depicts block diagram of the control system. The said control system comprises of PID controller, power devices, reservoir capacitor, data processing means embedded dedicated tailored logic loop, data storage means, RAM, power source, scalable analog inputs to connect sensors such as temperature, throttle, brake etc.; scalable PWM inputs to connect sensors such as magnetic pickup for sensing engine/vehicle speed. The control system further comprises of output means comprising digital outputs to operate the relays to control fuel supply, cooling fan, pump etc.; scalable analog outputs to drive the dashboard displays and actuators; scalable PWM outputs for proportional driver; encoder/tachometer inputs for position and direction feedback of the motor-generator; CAN communication port to communicate with ECUs, security device, displays etc.

The sensors are configured with the control system through isolator circuitry 200, 201 and 202. The sensors from brake, handbrake, clutch, Air conditioner, ignition, and selection mode are interfaced galvanic isolated digital circuitry 200. The pulsating signals such as VSS, ESS and from encoders are interfaced using galvanic isolated PWM and encoder circuitry 201. Signals related to motor temperature, engine temperature, battery temperature, throttle position, manifold pressure and brake position is interfaced with the control system using galvanic isolated analog circuitry 202.

The said motor control system is further configured with energy storage means 203 configured through energy management system module 204 and ultra capacitor 205. The output of the said motor control system is provided through potential free non contact type relay digital output 206 to one or plurality of fuel injector cut off. The potential free relay digital output 207 is configured with main contactor (DC supply), controller cooling fan, fault lamp, pump and spare provision. The output is further configured with driver information system 208. The motor power PWM control module 209 of the control system is configured with poly phase motor 210 that is coupled with engine using universal coupling 211 or belt drive 212 or jaw coupling.

A security device 215 is configured with the said motor control system. This device communicably linked with the said control system wherein appropriate aspect of the logic and supporting commands/software resides in the said security device wherein parts of the software are sent over to the said motor control system based on the operating mode of the vehicle/engine drive system. During various running conditions of vehicle, the said security device operates in steps wherein during starting of the vehicle, when the key is placed in the ignition, necessary logic and commands/software required during the start of the vehicle is communicated and transmitted to the said control system from the said security device;

during running of the vehicle the logic and command/software required for motor control during the highway operation is communicated and transmitted wherein the logic and commands/software necessary during the start would be erased from the said control system;

during ceasing operation of the vehicle, when the vehicle is shut off, the logic and commands/software in the said control system would be of non-critical nature or it would not have any operational logic and commands/software.

The said sensor system comprises of electronic interface provision to configure/tune engine/vehicle sensors with the said motor control system. The said sensors include throttle position sensor, mean absolute pressure sensor, mass air flow, Ven Air Flow sensor, Brake, HVAC, O2, vehicle speed sensor, engine speed sensor, Clutch, Gear position sensor, brake sensor but not limited to this. The sensed signals include TPS, MAP, VSS, brake, handbrake, clutch, reverse switch, engine RPM, coolant temperature, MAF, battery temperature the energy storage system and accelerator paddle position sensor interlocked with ignition switch of the engine of the vehicle.

The said motor control system 2 operates in steps of:
interfacing with the existing sensors (of the vehicle/engine) so as to acquire signals from the sensors'
measurement of difference between ambient and intake manifold pressure and communicating the same to the data processing means;
measurement of throttle position and communicating to the data processing means;
optionally measuring airflow to the engine and communicating to the data processing means;
estimating engine demand based on the said measurements;
estimating motor power necessary to assist the engine;
transmitting a signal to the said motor 4 so as to respond to the engine demand.

FIG. 3a illustrates operation of the motor control system during starting the vehicle wherein the control system operates in steps of:
sensing ignition on and fault detecting means;
sensing vehicle speed using VSS sensor;
if the vehicle is standstill, that is VSS indicated zero speed, sensing throttle position using TPS sensor and clutch state;
if the TPS sensor indicated greater than pre-set accelerator paddle position and clutch sensor indicates pressed condition;
starting engine by applying 100% torque set point to motor cum generator;
initiating power assist process wherein motor cum generator provides power assisting to the engine;
alternately if vehicle is in running condition that is VSS does not indicate zero speed, sensing whether throttle position greater than 0%; if it is so initiating power assisting process wherein motor cum generator provides power assisting to the engine.

In another embodiment the said motor control system operates to start vehicle in steps of:
sensing accelerated position wherein the said accelerator paddle is interlocked with ignition switch of the engine;
sending signal of the same to the said control system;
initiating excitation current to the said motor so as to start the same;
not initiating engine fuel supply so that the vehicle operates only on the motor as a power source;
sensing vehicle speed using VSS sensor;
upon exceeding predetermined speed initiating signal to the solenoid valve of the fuel supply to engine.

In yet another embodiment the motor control system operates to start vehicle in steps of:
upon pressing the accelerator paddle sending signal to the said control system;
initiating excitation current to the said motor so as to start the same;
initiating fuel supply to the engine;
operating motor and engine simultaneously to power the vehicle.

As illustrated in FIG. 3b, the motor control system operates to cut off fuel supply of the engine so as to stop engine firing in steps of:
sensing ignition state and sensing faults;
sensing whether vehicle speed is zero using VSS sensor;
sensing whether SOC and engine temperature is at desired levels;
beginning delay;
sensing speed of vehicle;
setting injector relays to cut-off the fuel supply to engine;
alternately if vehicle speed is not zero, sense throttle position by TPS sensor, if it is greater than zero initiate power assist process; otherwise initiate regeneration process.

As illustrated in FIG. 4, the said control system operates to initiate power assisting mode to the engine in steps of:
sensing battery State of Charge (SOC) position, whether it is greater than or less than zero;
based on the SOC position, selecting mode from city running condition or parallel hybrid mode;
if it is city running condition mode, sensing vehicle speed using VSS sensor with respect to minimum vehicle speed below which the vehicle will run purely on electric mode;
benchmarking the vehicle speed against pre-set speed;
if the vehicle speed is greater than the pre-set speed then resetting fuel injector relays to enable engine start and run the vehicle in parallel hybrid condition wherein engine power as well as motor power assist is utilised;
if the vehicle speed is below the pre-set speed then setting fuel injector relay to cut-off engine fuel supply;
operating motor cum generator to drive the engine at idle rpm by adding offset to control system set point;
rechecking the vehicle speed;
if parallel hybrid mode is selected then the fuel injector relay is reset to enable engine start so as to run the vehicle in parallel mode.

FIG. 5 illustrates the operation of the control system so as to operate the vehicle in parallel hybrid condition wherein vehicle is powered by both engine as well as motor cum generator. The control system operates in steps of:
identifying gear position based on the gear ratios of the engine system;
selection of the appropriate torque requirement based on the gear position, vehicle acid engine speed;
sensing throttle position using TPS sensor as well as torque requirement;

if it is greater than no load/idle state then establishing torque set point proportional to the throttle percentage opening otherwise operating in regeneration mode;

monitoring motor cum generator winding temperature;

if the winding temperature is greater than rated temperature such as 120° C. reduce the motor cum generator current limit by substantially lower amounts for every degree rise in motor cum generator winding temperature.

The energy storage system 3 comprises of one or plurality of energy storage devices 10 that are mounted in the vehicle with the aid of energy storage device mounting means (not shown). It may be noted that the disposition of the energy storage devices in FIG. 1 is only one of the representations for illustration. In one of the embodiment, the energy storage device is a battery. However, the batteries can be mounted at appropriate location in the vehicle on which the system of the present invention is to be adapted. The said batteries are configured with the battery charging means (not shown) that is further configured with the motor control system and motor. In one of the embodiments the battery is selected from lead acid, Li-ion, Ni-MH, fuel cell, hydrogen based energy storage devices and there like.

The said battery charging system is further configured with regenerative braking system comprising solid state power devices, a dedicated energy storage device control system embedded with an energy storage device control programme logic loop.

During regenerative braking the amount of charge varies depending on the difference in the kinetic energy before braking and after braking. The difference in energy runs generator. The generator produces electric charge. The charge that trickles from minimum braking is often not captured. Such charge can be captured using super capacitors. Once these super capacitors are charged, they are in turn used for charging the batteries. FIG. 6 depicts regeneration process to charge batteries of the energy storage system 3. The process is carried out in steps of:

sensing whether brakes are applied;

if the brakes are applied then setting the regeneration current higher value to apply electric brakes;

if the brakes are not applied then setting the regeneration current limit to lower value such that the braking effect is not felt when the vehicle is running down the slope;

measuring motor battery temperature;

if the battery temperature is greater than pre-set operating temperature, reducing the regeneration braking current limit to nominal charging current rating of the battery;

in loop checking whether brakes are applied or not.

FIG. 7 illustrates battery charging system schematic representation. The batteries of the said energy storage system are charged using super capacitor that provides power during short duration interruptions and voltage sags. The combination of super capacitor with a battery-based power supply system results in enhanced battery life. The batteries provide power only during the longer interruptions, reducing the cycling duty on the battery. FIG. 8 depicts fault finding process used by the control system.

The said power assist system upon integration with the parent vehicle operates in highway conditions wherein the vehicle speeds are higher and does not need significant power assist;

the motor is not operated at its peak power;

the motor provides a limited assist to the engine;

the said motor control system monitors the load/demand of the engine and responds to any sudden acceleration demands resulting in obviating the problems of frequent gear shifts at the time of overtaking the other vehicles on road.

The said power assist system upon integration with the parent vehicle operates in highway conditions wherein the vehicle runs at lower speeds with frequent stops and starts;

the said motor control system monitors the load/demand of the engine with respect to dynamic speed change of the vehicle and responds so that motor leads/assists the engine;

the motor is operated at its peak power so as to respond to the dynamic speed changes of the vehicle, faster than the engine keeping the Engine load low.

The process of starting the engine/vehicle initiates wherein the signal from the said throttle position is used to initiate starting wherein the said motor provides starting torque for engine to start the engine/vehicle.

The vehicle can be operated only on electricity/electric motor at low speeds wherein engine starts by initiating fuel supply above predetermined speed of the vehicle, engine stops if the vehicle does not move in predetermined seconds the engine gets turned off and subsequently motor stops wherein upon pressing of the accelerator, the motor starts driving engine and further fuel supply of the engine starts after predetermined speed of vehicle is reached.

In one of the embodiments of invention the said system is adapted to be used on aircraft propulsion system. In another aspect of the invention the said system of the present invention is adapted to be used in marine propulsion system. In another embodiment the system of the present invention is adaptable to any stationary engine.

In yet another embodiment the said motor transmission means is a gear system. In another variant of this embodiment the said transmission means is a chain drive.

In one of the embodiments energy storage device is battery and/or capacitor.

In another embodiment the power assisting system is adapted on two, three wheel, four wheel vehicle.

In yet another embodiment cooling means is not necessary for battery of the energy storage system.

In yet another embodiment cooling means is not necessary for motor.

The synergistic combination of the motor system; motor control system and energy storage device coupled to the regenerative braking system of the present invention enables the power assisting system of the present invention to adapt to the vehicle/engine without involving substantial modifications in engine, power train, drive train and vehicle, yet offering advantage of running the vehicle on two power sources operating in tandem. The engine and electric motor exploits advantages of each of the power source based on the operating conditions of the vehicle such that engine of the vehicle is operated in the range of average power requirement wherein power assisting system of the present invention selectively responds to the engine's peak power demands, air fuel intake condition so as to enhance fuel efficiency, reduce undesirable emissions and provide better drivability.

EXAMPLE

The power assisting system of the present invention was adapted on a hatchback city vehicle. Table 1 provides primary aspects and corresponding specifications of this vehicle are depicted.

TABLE 1

Vehicle Specifications

| Factors | Specifications |
|---|---|
| Curb weight | 740 Kgs |
| Swept volume | 796 cc |
| No. of cylinders | 3 |
| Engine type | FC engine, 4 valves per cylinder MPFI |

The motor of the power assisting system is mounted in the vicinity of the engine wherein a first pulley is mounted on the shaft of the motor and a second pulley is mounted on the engine crank shaft, the pulleys being operably coupled with an appropriate belt. The motor control system of the said power assisting system is interfaced with the existing sensors of the engine, motor control system and energy storage device. The energy storage devices used in this illustrative example are a set of lead-acid batteries that are disposed in the luggage space of the vehicle.

The hatchback vehicle adapted with the power assisting system of the present invention was tested on:
  chassis dynamometer and modified Indian driving cycle roads for more than 4000 KMs FIG. 10 depicts test results in terms of emission charts, in particular $CO_2$ emissions. FIG. 10a depicts the emission levels, in particular $CO_2$ (indicated with green colour) without adapting power assisting system of the present invention. FIG. 10b depicts the levels after adaptation of the power assisting system. It is evident from the two charts that the $CO_2$ level is substantially reduced in the vehicle after adaptation of the power assisting system. It is evident from FIG. 11a and FIG. 11b that the CO and Hydrocarbon emission levels are substantially reduced using power assisting system of the present invention. It may be noted that there is substantial improvement in fuel efficiency and reduction in emissions. The key findings from these tests are presented in Table 2.

TABLE 2

Test Results

| Factors | Critical value |
|---|---|
| Fuel Efficiency Improvement | 41% |
| Emission reduction | |
| CO2 | 30% reduction |
| CO | 38% reduction |
| THC | 17% reduction |
| NOx | 50% reduction |

It is evident from these tests that adaptation of the novel power assisting system of the present invention on vehicle results in substantial enhancement of the order of 40% in fuel efficiency and substantial reduction in emissions.

I claim:

1. A modular power assisting system for a vehicle comprising:
  a motor system configured to assist an engine of a vehicle, wherein the motor system comprises a motor, a motor transmission system for coupling the motor to the engine, and a mounting structure;
  a motor control system configured to provide at least one of speed control or torque control for the motor system;
  an energy storage system comprising an energy storage device including at least one battery, a battery charging system configured to charge the energy storage device using the motor, and a regenerative braking system that includes at least one solid state power device and is configured to utilize a reduction in kinetic energy of at least one of the vehicle or the engine to charge the energy storage device; and
  a sensor system configured to provide an interface between the motor control system and sensors within the vehicle, wherein the motor control system and the sensors are interfaced via isolators;
  wherein the motor control system is configured to control a current of the motor to operate the motor to selectively provide positive or negative torque to the engine based on signals from sensors within the vehicle that are used to predict power demand of the engine, and
  wherein the motor transmission system comprises either (a) a first pulley with a profiled groove coupled to a shaft of the motor, a second pulley coupled to a crank shaft of the engine, and a belt operably coupling the first pulley to the second pulley or (b) a universal coupling configured to couple a shaft of the motor directly to a crank shaft of the engine.

2. The modular power assisting system of claim 1, wherein the sensor system comprises isolator circuitry that includes galvanic isolated digital circuitry, isolated pulse width modulator and encoder circuitry, and galvanic isolated analog circuitry.

3. The modular power assisting system of claim 1, wherein the motor control system comprises a PID controller, a power device, a reservoir capacitor, a microcontroller, a data storage device, a memory, a power source, and a data input and output system.

4. The modular power assisting system of claim 3, wherein the data input and output system comprises:
  a scalable analog input interface configured to receive signals from at least one of a temperature sensor, a throttle sensor, or a brake sensor;
  a scalable pulse width modulated input interface configured to receive signals from a magnetic pickup for sensing at least one of engine speed or vehicle speed;
  a digital output interface configured to operate relays to control at least one of a fuel supply, a cooling fan, or a pump;
  a scalable analog output interface configured to drive at least one of a dashboard display and an actuator;
  a scalable pulse width modulated output interface configured to drive the motor;
  at least one of an encoder input interface or a tachometer input interface configured to receive position and direction feedback of the motor; and
  a controller area network communication port configured to communicate with at least one of an engine control unit, a security device, or a display.

5. The modular power assisting system of claim 1, wherein a sensor associated with at least one of a brake, a handbrake, a clutch, an air conditioner, an ignition, or a mode selection circuit is interfaced with the motor control system using galvanic isolated digital circuitry.

6. The modular power assisting system of claim 1, wherein pulsating signals from a vehicle speed sensor, an engine speed sensor, and one or more encoders are interfaced with the motor control system using galvanic isolated pulse width modulator and encoder circuitry.

7. The modular power assisting system of claim 1, wherein signals related to a motor temperature, an engine temperature, a battery temperature, a throttle position, a manifold pressure, and a brake position are interfaced with the motor control system using galvanic isolated analog circuitry.

8. The modular power assisting system of claim 1, wherein the motor control system is configured to communicate with fuel injectors of the engine using a potential-free non-contact type relay digital output.

9. The modular power assisting system of claim 8, wherein the potential-free non-contact type relay digital output is configured to communicate with a DC power supply, a controller cooling fan, a fault lamp, and a pump.

10. The modular power assisting system of claim 1, wherein the motor control system is configured to start the vehicle, wherein the modular power assisting system is configured to:
sense that an accelerator paddle is in an accelerated position, wherein the accelerator paddle is interlocked with an ignition switch of the engine;
initiate an excitation current to the motor to start the motor, wherein an engine fuel supply is not initiated so that the vehicle operates with the motor as the only power source;
sense a vehicle speed using a vehicle speed sensor; and
when the vehicle speed exceeds a predetermined speed, initiate a signal to a solenoid valve of the engine fuel supply.

11. The modular power assisting system of claim 1, wherein the motor control system is configured to start the vehicle, wherein the modular power assisting system is configured to:
upon sensing that an accelerator paddle has been pressed, send a signal representing that acceleration has been sensed to the motor control system;
initiate an excitation current to the motor to start the motor;
initiate a fuel supply to the engine; and
operate the motor and the engine simultaneously to power the vehicle.

12. The modular power assisting system of claim 1, wherein the motor control system is configured to:
interface with existing sensors of the vehicle so as to acquire signals from the existing sensors;
measure a difference between an ambient pressure and an intake manifold pressure and communicate the difference to a data processing device;
measure a throttle position and communicate the throttle position to the data processing device;
estimate engine demand based on the measurement of the difference between the ambient pressure and the intake manifold pressure and the measurement of the throttle position;
estimate a motor power necessary to assist the engine; and
transmit a signal to the motor to respond to the engine demand.

13. The modular power assisting system of claim 1, wherein the system is configured such that at high vehicle speeds, the motor control system monitors the demand of the engine and instructs the motor to operate below its peak power to provide assistance to the engine in the event of a sudden acceleration demand to reduce the necessity of frequent gear shifts.

14. The modular power assisting system of claim 1, wherein the system is configured such that at low vehicle speeds, the motor control system monitors the demand of the engine with respect to dynamic speed change of the vehicle and instructs the motor to operate at its peak power before the engine can respond to the dynamic speed change.

15. The modular power assisting system of claim 1, wherein the system is configured to allow the vehicle to be operated using only the electric motor at low speeds.

16. The modular power assisting system of claim 1, wherein the sensor system is configured to receive signals from a torque positioning sensor, a manifold absolute pressure sensor, a vehicle speed sensor, a brake, a handbrake, a clutch, a reverse switch, an engine RPM sensor, a coolant temperature sensor, a mass air flow sensor, a battery temperature sensor, and an accelerator paddle position sensor.

17. The modular power assisting system of claim 1, wherein the mounting structure comprises a bracket including a first surface that is substantially flat and includes at least one opening for mounting the motor and a second surface that is substantially flat and is coupled to the first surface with ribs, wherein the second surface comprises at least one elongated opening.

18. The modular power assisting system of claim 17, wherein the mounting structure further comprises a vibration isolation structure on at least one of the first or second surfaces to provide isolation from the engine of the vehicle.

19. The modular power assisting system of claim 18, wherein the vibration isolation structure comprises a cylindrical, sandwich type mount.

20. The modular power assisting system of claim 1, wherein the motor transmission system comprises a first pulley with a profiled groove coupled to the shaft of the motor, a second pulley coupled to the crank shaft of the engine, and a belt operably coupling the first pulley to the second pulley.

21. The modular power assisting system of claim 20, wherein the belt comprises one of a V type belt, a chain belt, or a ribbed belt.

22. The modular power assisting system of claim 21, further comprising a belt tensioning pulley configured to maintain belt tension between the first and second pulleys.

23. The modular power assisting system of claim 1, wherein the motor transmission system comprises a universal coupling or jaw coupling that couples the shaft of the motor directly to a crank shaft of the engine.

24. The modular power assisting system of claim 1, wherein the energy storage system further comprises a dedicated battery control system embedded with a battery control program logic loop.

25. The modular power assisting system of claim 1, wherein the energy storage device further comprises an ultra capacitor.

26. The modular power assisting system of claim 25, wherein the energy storage device is configured such that the ultra capacitor provides power to the motor during certain conditions and the at least one battery provides power to the motor during certain other conditions.

27. The modular power assisting system of claim 1, wherein the at least one battery is a lead acid battery, a lithium-ion battery, or a nickel-metal-hydride battery.

28. The modular power assisting system of claim 1, wherein the regenerative braking system is configured to capture energy using super capacitors and to charge the at least one battery of the energy storage system.

29. The modular power assisting system of claim 1, wherein the motor control system is configured to start the vehicle, and wherein the modular power assisting system is configured to:
sense whether the ignition is on and detect whether any faults are present;
sense vehicle speed using a vehicle speed sensor;
if the vehicle is at a standstill, sense a throttle position using a throttle position sensor and a clutch sensor and, if the throttle position sensor indicates greater than a preset accelerator position and the clutch sensor indicates a pressed condition, start the engine by applying a 100% torque set point to the motor and initiating a power assist process in which the motor provides a power assist to the engine; and if the vehicle is moving, sense whether the throttle position is greater than 0%, and if so, initiate a power assist process in which the motor provides a power assist to the engine.

30. The modular power assisting system of claim 1, wherein the motor control system operates to cut off fuel supply of the engine, and wherein the modular power assisting system is configured to:

sense ignition state and sense faults;
sense whether vehicle speed is zero using a vehicle speed sensor;
sense whether a state of charge of the at least one battery and an engine temperature are above preset levels;
begin delay;
sense the vehicle speed;
set injector relays to cut-off the fuel supply to the engine; and
if the vehicle speed is not zero, sense a throttle position using a throttle position sensor, wherein, if the throttle position is greater than zero, a power assist process is initiated, and wherein, if the throttle position is not greater than zero, a regeneration process is initiated.

31. The modular power assisting system of claim 1, wherein the motor control system operates to initiate a power assisting mode to the engine, and wherein the modular power assisting system is configured to:

sense whether a state of charge position is greater than or less than zero;
based on the state of charge position, selecting a city running mode or a parallel hybrid mode;
if the city running mode is selected, determine the vehicle speed using a vehicle speed sensor with respect to a minimum vehicle speed below which the vehicle will run in an electric mode and benchmark the vehicle speed against a pre-set speed, and
if the vehicle speed is greater than the pre-set speed, reset fuel injector relays to enable the engine to start and run the vehicle in the parallel hybrid mode wherein engine power as well as motor power assist is utilized, and
if the vehicle speed is below the pre-set speed, set the fuel injector relays to cut off an engine fuel supply and operate the motor to drive the engine at an idle rpm by adding an offset to a control system set point, and recheck the vehicle speed; and
if parallel hybrid mode is selected, reset the fuel injector relay to enable the engine to start so as to run the vehicle in the parallel hybrid mode.

32. The modular power assisting system of claim 1, wherein the motor control system operates so as to operate the vehicle in parallel hybrid condition, and wherein the modular power assisting system is configured to:

identify a gear position based on the gear ratios of the engine system;
select an appropriate torque requirement based on the gear position, vehicle speed, and engine speed;
sense a throttle position using a throttle position sensor and determine torque requirement;
if the torque requirement is greater than a no-load requirement, establish a torque set point that is proportional to a throttle percentage opening, and if the torque requirement is zero, operating in a regeneration mode;
monitoring a motor winding temperature; and
if the motor winding temperature is greater than a preset temperature, reducing a motor current by fractional amounts for every degree rise in motor winding temperature.

33. The modular power assisting system of claim 1, wherein the regenerative braking system is configured to perform a method comprising the steps of:

sensing whether the vehicle brakes are being applied;
if the brakes are being applied, setting a regeneration current limit to a first value to apply electric brakes;
if the brakes are not being applied, setting the regeneration current limit to a second value lower than the first value;
measuring a temperature of the at least one battery;
if the battery temperature is greater than a preset operating temperature, reducing the regeneration current limit to a nominal charging current rating of the battery.

34. The modular power assisting system of claim 1, wherein the system is configured for use with at least one of a two wheel, three wheel, or four wheel vehicle.

35. The modular power assisting system of claim 1, wherein a ratio of a diameter of the first pulley to a diameter of the second pulley is in a range from 1:1 to 1:2.

36. The modular power assisting system of claim 1, wherein an engine drive system on which the modular power assisting system is adapted operates at reduced power than the rated power of the engine drive system.

37. The modular power assisting system of claim 1, further comprising a security device communicably linked with the motor control system and configured to transmit signals to the motor control system based on an operating mode of the vehicle, wherein the security device is configured to:

during a starting mode of the vehicle, after a key is placed in an ignition of the vehicle, transmit one or more signals required for starting the vehicle to the motor control system,
during a running mode of the vehicle, transmit one or more signals required for the running mode to the motor control system, wherein one or more commands received during the starting mode are erased from a memory of the motor control system, and
during a ceasing operation mode of the vehicle, when the vehicle is shut off, commands received from the security device are erased from the memory of the motor control system.

38. A modular power assisting system for a vehicle comprising:

a security device communicably linked with a motor control system, wherein the motor control system is configured to provide at least one of speed control or torque control for a motor system that is configured to assist an engine of the vehicle, wherein the security device is configured to transmit signals to the motor control system based on an operating mode of the vehicle, and wherein the security device is configured to:
during a starting mode of the vehicle, after a key is placed in an ignition of the vehicle, transmit one or more signals required for starting the vehicle to the motor control system,
during a running mode of the vehicle, transmit one or more signals required for the running mode to the motor control system, wherein one or more commands received during the starting mode are erased from a memory of the motor control system, and
during a ceasing operation mode of the vehicle, when the vehicle is shut off, commands received from the security device are erased from the memory of the motor control system.

39. A modular power assisting system for a vehicle comprising:
a motor control system comprising a PID controller, a power device, a reservoir capacitor, a microcontroller, a data storage device, a memory, a power source, and a data input and output system, wherein the data input and output system comprises:
a scalable analog input interface configured to receive signals from at least one of a temperature sensor, a throttle sensor, or a brake sensor;
a scalable pulse width modulated input interface configured to receive signals from a magnetic pickup for sensing at least one of engine speed or vehicle speed;
a digital output interface configured to operate relays to control at least one of a fuel supply, a cooling fan, or a pump;
a scalable analog output interface configured to drive at least one of a dashboard display and an actuator;
a scalable pulse width modulated output interface configured to drive the motor;
at least one of an encoder input interface or a tachometer input interface configured to receive position and direction feedback of the motor; and
a controller area network communication port configured to communicate with at least one of an engine control unit, a security device, or a display,
wherein digital signals from sensors are interfaced with the motor control system using galvanic isolated digital circuitry, pulsating signals from the sensors are interfaced with the motor control system using galvanic isolated pulse width modulation and encoder circuitry, and analog signals from sensors are interfaced with the motor control system using galvanic isolated analog circuitry, and
wherein, upon adaptation onto an engine drive system of the vehicle, the motor control system is configured to:
interface with existing sensors of the vehicle so as to acquire signals from the existing sensors,
measure a difference between an ambient pressure and an intake manifold pressure and communicate the difference to a data processing device,
measure a throttle position and communicate the throttle position to the data processing device, and
estimate engine demand based on the measurement of the difference between the ambient pressure and the intake manifold pressure and the measurement of the throttle position.

40. The modular power assisting system of claim 39, wherein the motor control system is further configure to measure airflow to the engine.

* * * * *